July 8, 1969     H. M. HEDGES     3,453,666

SOLAR THERMAL BLANKET

Filed Oct. 3, 1967

INVENTOR.
HENRY M. HEDGES

BY

*Carl R. Brause*

ATTORNEY

United States Patent Office 3,453,666
Patented July 8, 1969

3,453,666
SOLAR THERMAL BLANKET
Henry M. Hedges, 1415 Plum St.,
San Diego, Calif. 92106
Filed Oct. 3, 1967, Ser. No. 672,476
Int. Cl. E04h *3/19;* F24j *3/02*
U.S. Cl. 4—172          9 Claims

ABSTRACT OF THE DISCLOSURE

A blanket, useful as a swimming pool cover, formed from a substantially transparent, flexible material, such as a suitable plastic, so that the sun's rays can penetrate the blanket and heat water therebeneath. The blanket includes at least one air chamber having the same width and length as the blanket, which is filled with air to provide an effective insulating quality to the blanket. When the blanket is laid upon the surface of water in a swimming pool, the sun heats the water beneath the blanket and the air-filled blanket restricts transfer of heat from the covered water to the air. Multiple air chambers can be provided one atop another, and the number of such chambers that are inflated controls the amount of heat that escapes from the water to the air.

BACKGROUND OF THE INVENTION

Swimming pools are expensive to heat because of the large volume of water involved and the loss of heat or B.t.u.'s to the air above the water. Yet the use of swimming pools are greatly increased where the water is heated, because many people desire to swim in water having a higher temperature than the water can be heated by the sun considering heat loss to the surrounding air. Even in warmer climates where the sun heats the water to a desirable temperature during the daytime, the water cools during the night to an undesirable temperature when the ambient temperature drops. In colder climates, the temperature of the water is not appreciably increased even during the daytime because of the constant loss of heat to the colder air. Thus conventional heating equipment is required to maintain a suitable water temperature if there is to be optimum use of a pool and such equipment is costly to install and expensive to operate.

SUMMARY OF THE INVENTION

The present invention provides a simple and relatively inexpensive device for effectively heating the water in a swimming pool, without having to install and operate expensive heating systems or where such heating systems have been installed, to reduce the cost of their operation while maintaining a desired water temperature. Also the invention, when installed, protects the pool from dirt, leaves and the like entering the water and protects the pool from unauthorized use.

The preferred embodiments of the present invention take the form of a solar thermal blanket formed completely of transparent, flexible, waterproof material. The blanket contains at least one air chamber with a simple inflating connection that can be readily attached to any source of air such as a vacuum cleaner, hair dryer, etc. The sun's rays penetrate the transparent blanket and heat the water beneath the blanket, and the air filled blanket retains the heat below it.

Therefore it is an object of this invention to provide a new and improved solar thermal blanket formed entirely of a flexible, transparent, water-proof material, adapted to transmit heat from the sun to a body of water therebeneath, the blaanket including at least one air chamber throughout its length and width to serve as a heat conduction insulator.

It is another object of this invention to provide a new and improved solar thermal blanket which includes means to quickly and easily introduce air into the chamber from a variety of air sources, and quickly and easily exhaust air from the chamber, said means being readily stored within the confines of the blanket when the blanket is in use.

It is a further object of the present invention to provide a new and improved solar thermal blanket including a simple structure for easily controlling and varying its heat insulation qualities.

It is another object of the present invention to provide a new and improved solar thermal blanket that functions as a swimming pool cover and which is simple and inexpensive to make and is easy to store and use.

Further objects and advantages of the present invention will readily occur to one skilled in the art to which the invention pertains upon reference to the accompanying detailed description.

Referring to FIGURES 1 through 4, the embodiment of the invention includes a blanket indicated generally by the number 10. This blanket is used in the present instance as a swimming pool cover that is substantially the same size as the water surface area of the pool with which it is to be used, such as defined by the edge of pool 38. The blanket is formed of a plurality of sheets, see FIGURES 2 and 4, of transparent material such as polyethylene, polyvinyl chloride or other suitable materials. The sheets are sealed along their edge portions 13, 16 and 43 to form one or a plurality of sealed, internal chambers 18, 60 and 58. A satisfactory construction utilizes transparent sheets that are .002 to .005 inch thick and that form internal chambers that may be approximately three-quarters of an inch in height when inflated. The maximum inflated height or width of the chambers will be as desired, however too large a height can permit convection currents within the chamber that reduces its beneficial purpose.

Figure 1:
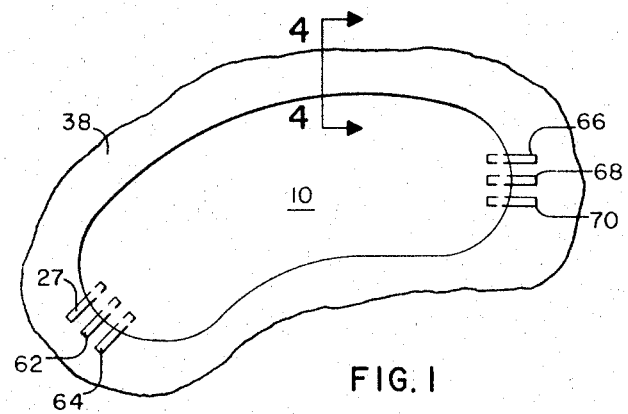
FIGURE 1 is a top plan view of a swimming pool with an embodiment of the solar thermal blanket lying in place on the surface of the water.
Figure 2:
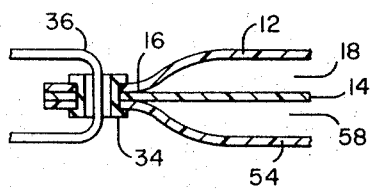
FIGURE 2 is a fragmentary section of the solar thermal blanket showing the sealed edge of the blanket and a blanket tie.

The blanket 10 has a plurality of access inflating and deflating tubes for inflating and deflating the chambers in the blanket. As illustrated in FIGURE 1, tubes 27, 62 and 64 connect at one end to the respective chambers 18, 58 and 60, and tubes 66, 68 and 70 are connected at the other end of the respective chambers 18, 58 and 60. As will be more apparent hereinafter, each chamber need only have one inflating and deflating tube, and a plurality of tubes is merely more convenient. It should also be recognized that the blanket may have one or a plurality of chambers, however it has been found that three chambers provide the optimum conditions for light transmittal therethrough and insulation against heat transfer through the blanket from the water to the ambient air.

Figure 3:
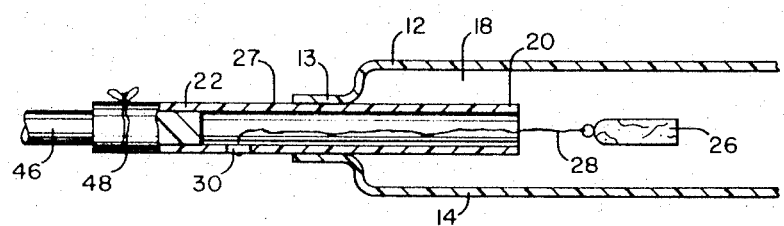
FIGURE 3 is a fragmentary elevation, partly in section, depicting the blanket air chamber access tube with a dehydrator cartridge affixed to the tube and extending into the internal air chamber.

Referring to FIGURE 3, there is illustrated a single chamber having sheets 12 and 14 and an access tube 27. The access tube 27 is sealed 13 around its entire circumference between the top sheet 12 and bottom sheet 14 at the edge of the blanket. The access tube 27 is large enough to insert a person's hand therethrough and preferably is approximately six inches wide. It is formed of a similar material as the blanket and extends about two feet outside the blanket to form an external tube portion 22 and about two feet into the chamber 18 to form an internal tube portion 24. The flexible external portion 22 of the access tube 27 is readily attachable to outlets of various air sources for inflating the chamber 18. A vacuum cleaner in blowing condition with a hose outlet 46 in one example. The hose outlet 46 fits inside the end 22, and an air seal is accomplished by tying a line 48 around end 22 or fitting a rubber band over the end 22.

It is desirable to keep the air in chamber 18 dry. In the embodiment of FIGURE 3, this is accomplished by use of a moisture absorbing means such as a cartridge of silica gel 26. The cartridge 26 is secured to one end of line 28. The other end of line 28 is secured to attachment 30 that is secured to the external tube portion 22. Thus the cartridge 26 is inserted into the chamber and left there to absorb moisture from the air in the chamber. The cartridges 26 can be removed as desired by reaching into the access tubes, grasping line 28 and retrieving the cartridge.

OPERATION

The blanket 10, when not in use, is normally deflated and folded into a lightweight compact package for storage. When put to use, the blanket 10 is unfolded and the external tube portions 22 of access tubes 27, 62 and 64 are attached to a suitable source of air such as the vacuum cleaner hose 46 shown in FIGURE 3, and are held in position by the rubber band or elastic cord 48. The blanket is then inflated, and when the chamber 18 contains sufficient air, the external tube portions 22 are removed from the vacuum cleaner hose 46 and closed off by the rubber bands or elastic cords 48. The outer tube portions 22 are then tucked into the inner tube portions 20.

Figure 5:
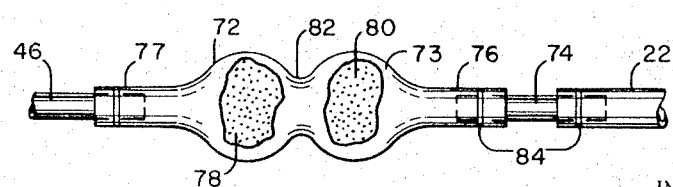
FIGURE 5 is a fragmentary elevention, partly in section, of an embodiment of a dehydrator for use in the invention.

Additionally to prevent the condensing of moisture from the air pumped into the chambers, the air inserted into the chambers can be dried by passing the air through a dehydrator. Referring to FIGURE 5, a container that may be made of plastic or other suitable material has open tube ends 76 and 77 and a pair of enlarged portions 72 and 73 with a reduced diameter or constriction 82 therebetween. Coarse silica gel cartridges may be contained in one of the enlarged portions, as for example 78, and another suitable dehydrating substance 80 may be contained in the other enlarger portion 73. The tube end 77 is connected by a sealed connection to the end 46 of an air source and the other tube end 76 is connected to a more rigid tube 74 to the end 22 of access tube 27. Rubber bands 84, as for example, may be used to seal and hold the connections. In operation the air passes from the air source through hose 46, dehydrating material 78 and 80 and through tube portion 22 to the chamber of the blanket 10.

The inflated blanket is buoyant and floats in position on the surface of the water. Since the blanket is transparent, the usual attractive blue color of the pool water shows through the cover. The blanket 10 is fixed in place by tying the straps 36 to the retainers (not shown) along the pool walkway or by hooking the grommets 34 over the hook members 42. The inflated blanket prevents people, particularly small children, from falling into the water with the resultant possibility of drowning. It also keeps the pool clean because it form a protective covering.

During hours of sunshine, the sun's rays 44 penetrate the completely transparent blanket and heat the water beneath the blanket. Since the air within the blanket is heated, there is also conduction heating of the water which lies adjacent the blanket. The blanket provides a good insulating cover to hold the heat in the water of the pool. Thus, the blanket can be placed over the water surface during the day, and the water will be warm and suitable for swimming. At night the blanket prevents excessive heat loss to the colder ambient air.

When it is desired to remove the blanket from the pool, the straps 36 are loosened from the retainers (not shown) or the grommets are lifted off the hook members 42, and at least a portion of the blanket 10 is moved onto the walkway beside the pool. The external tube portion 22 is removed from the tucked in position and the rubber band or elastic cord 48 is removed. The user's hand is then inserted through the external tube portion 22, and through the internal tube portion 20. The internal tube portion is grasped with the hand and pulled out through the external tube portion 22. The air can now be effectively removed from blanket chambers 18, 58 and 60. If the blanket chambers are moist and the silica gel cartridge 26 is saturated, then the line 28 is pulled out of the access tubes 22 or 62 or 64. The cartridge is removed from the line 28 and dried in a suitable place such as the kitchen oven.

The air may be removed from the blanket in any suitable manner and the access tubes at each end of the blanket facilitate such air removal. However, it should be understood that only one access tube is necessary for inflating or removing inflating air from each chamber. Also the access tube illustrated in FIGURE 3 is the same construction used for all the access tubes 27, 62, 64, 66, 68 and 70.

Figure 4:
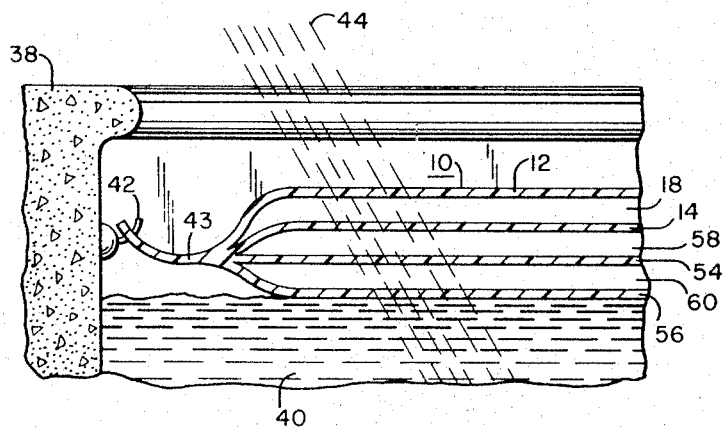
FIGURE 4 is a cross-sectional view taken along lines 4—4 of FIGURE 1.

FIGURE 4 illustrates three chambers 18, 58 and 60 forming one blanket 10. The chambers are disposed one atop another. Separate inflating means, such as the access tubes 27, 62 and 64 are provided for each chamber. This construction provides a greater insulation against heat escaping from the pool water than does two chambers or a single chamber. Further one or more of the chambers can be selectively not inflated or only partially inflated to provide less insulation. This provides a control for maintaining the water at selectively lower temperatures. Thus, a simple means is provided for controlling the heat maintained in the water.

It will be readily apparent that such a construction could be used as a field cover, or a green house structure to heat a covered surface.

Having described my invention, I claim:

1. A solar thermal blanket for use on the surface of water in a swimming pool comprising:
   a flexible, water proof blanket for resting on the surface of the water,
   said blanket being transparent and transmitting sunlight therethrough to heat the covered water by the sunlight,
   said blanket having at least two relatively thin layers that are sealed together forming a sealed air chamber,
   and closable tube means for passing inflating air under pressure into said chamber with said air being the sole support for separating said layers and forming an air space between said layers throughout said chamber.

2. A solar thermal blanket as claimed in claim 1 wherein:
   said air chamber is open and continuous throughout the area of said blanket.

3. A solar thermal blanket as claimed in claim 1 in which:
   said blanket having a plurality of said layers positioned one on top of the other forming a plurality of sealed chambers,
   each of said chambers having closable conduit means for selectively and individually inflating and deflating each of said chambers whereby the heat insulation of said blanket is selectively adjustable by selecting the number of chambers that are inflated and the degree that said chambers are inflated.

4. A solar thermal blanket as claimed in claim 2 in which:
   said closable tube means comprises a pair of inflating tubes communicating with said chamber.

5. A solar thermal blanket as defined in claim 3 in which:

said tube means comprising flexible tubes inserted between the edges of the walls of each of said layers providing an opening to each of said chambers, a portion of said tubes extending external to said edges of said blanket and a portion of said tubes extending into said chambers of said blanket, the external portion of said tubes being capable of being clinched and tucked into the internal portion when the blanket is inflated, and said internal portion of said tubes being capable of being pulled out by hand through the external portions for exhausting the air from the blanket chambers.

6. A solar thermal blanket as defined in claim 5 including:

moisture absorbing means for being attached to a retrievable line that is capable of passing through said tubes and inserting said moisture absorbing means into said chambers.

7. A solar thermal blanket as defined in claim 6 including means in the outer edge of said blanket for fixing the cover to a retaining structure on the pool.

8. A solar thermal blanket as defined in claim 7 including:

said external portion of said tubes being flexible and capable of being fitted and sealed over a hose carrying air under pressure to inflate said chambers.

9. A solar thermal blanket as defined in claim 8 including:

dehydrating means positioned between said hose and said external portion of said tubes for removing moisture form air passing therethrough, said dehydrating means comprising a conduit having two enlarged portions and a reduced diameter portion between said enlarged portions, and said enlarged portions containing dehydrating material.

References Cited

UNITED STATES PATENTS

| 2,996,729 | 8/1961 | Bailey | 126—270 X |
| 3,072,920 | 1/1963 | Yellott | 126—271 X |

FOREIGN PATENTS

| 915,894 | 1/1963 | Great Britain. |

CHARLES J. MYHRE, *Primary Examiner.*

U.S. Cl. X.R.

126—271